United States Patent Office 3,388,190
Patented June 11, 1968

3,388,190
DYEABLE POLYPROPYLENE
George M. Bryant, South Charleston, and Nathan L. Zutty, Charleston, W. Va., assignors to Union Carbide Corporation, a corporation of New York
No Drawing. Filed Apr. 23, 1962, Ser. No. 189,303
9 Claims. (Cl. 260—897)

This invention relates to new and valuable polyolefin compositions. More particularly, it is concerned with polypropylene compositions which can be used to produce fibers which are readily dyed by conventional dyeing techniques and films having improved dyeability and printability.

Fibers of polypropylene, both homopolymeric and copolymeric, are well known. However, these fibers are very difficult to dye and, in general, defy dyeing by the conventional procedures. Several approaches have been taken in attempts to improve the dyeability of polypropylene; for example, graft polymerization with dye-receptive comonomers has been tried, but this has affected the spinnability of the polymer and has not been commercially practical. Attempts have also been made to improve dyeability by blending the polypropylene with polyurethanes, polyamides, epoxy resins, and the like—again, with little or no success. At most, these procedures have resulted in moderate improvements in dyeability, but these improvements have been offset by other problems, such as poor compatibility, resulting in poor prduct uniformity and spinning problems. Further, the dyeings obtained have not been satisfactory in depth of shade or fastness properties. Films made from the polyolefin resins have been found to be difficult to print on, and expensive and time consuming procedures, such as flame treatment or radiation, have been employed to improve the printability properties of such films. Also, in some instances it has been difficult to seal the edges of the films after such treatments.

It has now been found that polypropylenes suitable for use in the production of fibers can be rendered dye-receptive by incorporating in them a minor amount of a particular class of modifying copolymers. It has also been found that films of improved printability can be produced from the blends herein contemplated.

The polypropylenes used to prepare the modified polypropylene compositions of this invention have a density of above about 0.89 gram per cubic centimeter and a melt index of below about 100 decigrams per minute measured at 230° C.

The modifying copolymers incorporated with the polypropylene to produce the blends of this invention are the copolymers of ethylene with a polymerizable compound containing the polymerizable group $CH_2=C<$, such as (a) an acrylyl group of the formula $$CH_2=\overset{R}{\underset{|}{C}}CO-$$

wherein R is a hydrogen atom or methyl or (b) a vinyl group of the formula $CH_2=CH-$, as hereinafter further defined.

The polymerizable acrylyl-containing compounds have the formula

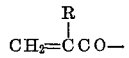

wherein R' is an amido group of the formula

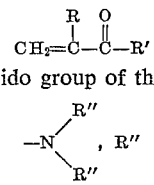

being a hydrogen atom, an alkyl radical having up to about 5 carbon atoms or a substituted alkyl radical, or an epoxyalkyloxy group containing from 1 to about 10 carbon atoms therein. Illustrative thereof are the following groups: amido, n-butylamido, t-butylamido, N,N-dimethylaminopropylamido, sodium(2-amino-2-methylpropane sulfonate), N,N-di-n-butylamido, 1,2-epoxypropanoxy, 1,2-epoxybutanoxy, 2,3-epoxybutanoxy, 1,2-epoxyhexanoxy, 3,4-epoxyhexanoxy, 1,2-epoxynonanoxy, 4,5-epoxydecanoxy, and the like. Suitable monomers are, for example, acrylic acid, glycidyl acrylate, 2,3-epoxybutyl acrylate, 1,2-epoxyhexyl acrylate, 1,2-epoxydecyl and the corresponding methacrylates of the above-named acrylates, acrylamide, methacrylamide, t-butylacrylamide, N-(N',N'-dimethylaminopropyl)acrylamide, sodium-2-acrylamido-2-methylpropane sulfonate, and the like.

The modifying copolymers contain from about 0.5 percent to about 50 percent by weight of the polymerizable compound containing the polymerizable $CH_2=C=$ group as previously defined; preferably the concentration is from about 5 to 40 percent by weight, with the most preferred concentration being from about 10 to 30 percent by weight. Their melt indices were determined at 190° C.

The modifying copolymers are produced by conventional high pressure polymerization processes which are well known to the ordinary scientist skilled in the art; for example, a mixture of the comonomers is polymerized at elevated pressures above about 40° C. in contact with a catalyst which is capable of forming free radicals under the polymerization conditions employed. Among the catalysts which can be used are oxygen; peroxidic compounds such as hydrogen peroxide, diethyl peroxide, dipropionyl peroxide, acetyl peroxide, perbenzoic acid, dibenzoyl peroxide, perlauric acid, peracetic acid, acetyl benzoyl peroxide, di-tertiary-butyl peroxide, tertiary-butyl hydroperoxide, and so forth; azo type compounds such as disclosed in United States Patent 2,471,959, azo-bis-isobutyrylnitrile; the alkali metal and ammonium persulfates, perborates, and percarbonates and the like.

The polypropylene compositions of this invention are produced by incorporating from about 1 percent to about 80 percent by weight of the modifying copolymer into the propylene polymer; preferably the concentration of modifying copolymer is from about 2.5 percent to about 40 percent by weight, with the most preferred concentration being from about 5 percent to about 20 percent by weight.

The improved compositions of this invention are homogeneous blends and can be prepared by mixing the solid polymers in conventional mixing equipment such as dough mixers, roll mixers, or Banbury mixers; by extrusion; or by fluxing the solid polymers. If desired, solution mixing can be used by proper selection of solvents. During this blending procedure antioxidants, heat stabilizers, delusterants, and other known additives can be added to the compositions.

Fibers can be spun from the polypropylene compositions of this invention by conventional spinning techniques; for example, the compositions can be melt spun or solution spun and the filaments can then be stretched to orient the molecules and develop the desired tensile properties in the fibers. The preferred compositions for fiber applications are those containing from 2.5 percent to 40 percent by weight, preferably 5 percent to 20 percent by weight of the modifying copolymer in the blend. The fibers produced from the compositions of this invention can be employed in the many applications in which synthetic fibers are used. These fibers are more readily dyed by conventional dyeing techniques to shades which are much deeper than have heretofore been obtainable on polypropylene fibers. Among the dyes that can be used are the well known acid, dyes, disperse dyes, soluble vat dyes, azoic dyes, premetallized dyes, and the like. In a typical dyeing procedure with the acid dyes and premetallized dyes, a 50 to 1 dye bath ratio can be used, the bath containing 1 percent by weight of a methyl polyethanol quaternary amine, 2 percent sulfuric acid, and 3 percent of the dye, all based on the weight of the fiber. The dyeing is carried out for ninety minutes at the boil and the fiber is then rinsed, scoured, and dried. When a disperse dye is used, a typical dye bath contains 1 percent sodium N-methyl-N-oleoyl taurate, 2 percent of the disperse dye, a dye bath ratio of about 40 to 1 and a one hour boiling period.

The amount of dye on the fiber, or the depth of color, is approximately proportional to the K/S value, which is a measure of the light reflected from the dyed sample. The larger the K/S value, the deeper the shade, and a K/S value of 20 indicates that the shade is approximately twice as deep as the shade represented by a K/S value of 10. The determination of the K/S values is set forth in an article by D. B. Judd, "Color in Business," Science and Industry, 1952, pages 314 to 342. Among the dyes that can be used to dye the fibers of this invention are the following:

Acid

Yellow:
  1—C.I. 10316    29—C.I. 18900
  3—C.I. 47005    36—C.I. 13065
  7—C.I. 56205    42—C.I. 22910
  11—C.I. 18820    54—C.I. 19010
  23—C.I. 19140    99—C.I. 13900
Orange:
  1—C.I. 13090/1    49—C.I. 23260
  7—C.I. 15510    72—C.I. 18740
  10—C.I. 16230    74—C.I. 18745
  24—C.I. 20170
Red:
  1—C.I. 18050    85—C.I. 22245
  12—C.I. 14835    89—C.I. 23910
  14—C.I. 14720    115—C.I. 27200
  26—C.I. 16150    116—C.I. 26660
  34—C.I. 17030    134—C.I. 24810
  37—C.I. 17045    179—C.I. 19351
  73—C.I. 27290
Violet:
  1—C.I. 17025    17—C.I. 42650
  7—C.I. 18055    43—C.I. 60730
Blue:
  1—C.I. 42045    59—C.I. 50315
  9—C.I. 42090    83—C.I. 42660
  22—C.I. 42755    102—C.I. 50320
  25—C.I. 62055
Green:
  1—C.I. 10020    20—C.I. 20495
  3—C.I. 42085    50—C.I. 44090
  16—C.I. 44025
Brown:
  14—C.I. 20195    42—C.I. 14251
Black:
  1—C.I. 20470    48—C.I. 65005
  24—C.I. 26370    52—C.I. 15711

Basic

Yellow:
  1—C.I. 49005    9—C.I. 46040
Orange:
  2—C.I. 11270    15—C.I. 46045
Red:
  1—C.I. 45160    9—C.I. 42500
Violet:
  1—C.I. 42535    14—C.I. 42510
  3—C.I. 42555
Blue:
  5—C.I. 42140    26—C.I. 44045
  7—C.I. 42595
Green:
  4—C.I. 42000
Brown:
  2—C.I. 21030

Yellow:
  1—C.I. 10345
  3—C.I. 11855
Orange:
  1—C.I. 11080
  3—C.I. 11005
Red:
  1—C.I. 11110
  4—C.I. 60755
  11—C.I. 62015
Violet:
  1—C.I. 61100
  4—C.I. 61105
Blue:
  1—C.I. 64500
  3—C.I. 61505
Black:
  1—C.I. 11365

Disperse

Yellow:
  31—C.I. 48000
Orange:
  7—C.I. 11240
Red:
  13—C.I. 11115
  15—C.I. 60710
  17—C.I. 11210
Violet:
  8—C.I. 62030
  13—C.I. 11195
Blue:
  7—C.I. 62500
Black:
  7—C.I. 11035

Azoic diazo components

Diazo:    Diazo:
  1—C.I. 37135    20—C.I. 37175
  2—C.I. 37005    28—C.I. 37151
  3—C.I. 37010    32—C.I. 37090
  4—C.I. 37210    34—C.I. 37100
  5—C.I. 37125    35—C.I. 37255
  6—C.I. 37025    38—C.I. 37190
  8—C.I. 37110    41—C.I. 37165
  10—C.I. 37120    44—C.I. 37000
  13—C.I. 37130    48—C.I. 37235

Azoic coupling components

Coupling:    Coupling:
  2—C.I. 37505    14—C.I. 37558
  3—C.I. 37575    17—C.I. 37515
  5—C.I. 37610    20—C.I. 37530
  7—C.I. 37565    29—C.I. 37527
  10—C.I. 37510    34—C.I. 37531
  12—C.I. 37550    36—C.I. 37585
  13—C.I. 37595

The polypropylene compositions of this invention are readily extruded by conventional procedures to produce rods, films, and protective coatings. The films so obtained are amenable to printing by conventional procedures without any further surface treatment of the film being necessary.

The modifying copolymers added to the propylene polymers to produce the polypropylene compositions of this invention are readily compatible with the propylene polymers and relatively clear, tough compositions are obtained. These blends show little sweat-out on heating, good product uniformity, improved printability, reduced fibrillation, and many other desirable properties.

The melt index (at 230° C.) and density of the compositions of this invention were determined using the test procedures set forth as ASTM D1238–52–T and ASTM D1505–57, respectively.

In the following examples, which are not to be construed as limiting the invention in any manner whatsoever, parts are by weight unless otherwise indicated.

EXAMPLE 1

A copolymer was produced by polymerizing a mixture of ethylene containing 1.1 percent by weight of acrylic acid. The polymerization was carried out at 15,000 p.s.i.g. and at 160° C. using 60 parts per million of di-tertiary-butyl peroxide as catalyst. There was recovered an ethylene/acrylic acid copolymer having an acrylic acid content of 8.2 percent by weight and a melt index of 7.32 dgm./min.

A blend was prepared by roll milling polypropylene having a melt index of 4 dgm./min. and a density of 0.91 gram/cc. with a sufficient amount of the above copolymer so that the blend had a 10 percent by weight copolymer concentration. The blending was carried out on a roll mill at 170° C. and it was readily accomplished without any sign of incompatibility of the two resins being observed. The blended composition was melt spun at 275° C. through a spinnerette having 20 holes, each 0.045 inch in diameter. The orifice velocity was 3.99 ft./min. and the take-up velocity was 600 ft./min. The multifilament yarn was then stretched 250 percent in a steam atmosphere (Yarn I).

In a similar manner a control yarn (Yarn II) was spun for comparison purposes using the same polypropylene used to prepare the blend. The properties of the yarns are summarized below:

| Yarn | I | II |
| --- | --- | --- |
| Tenacity, g.p.d. | 2.6 | 4.4 |
| Elongation, percent | 60 | 30 |
| Stiffness modulus, g.p.d. | 28 | 38 |
| Shrinkage, percent in boiling water | | 8 |

Samples of each of the above yarns were dyed by the previously indicated procedures. Yarn I was dyed to a deeper shade than Yarn II with Disperse Red 17; Yarn I had a K/S value of 3.3 and Yarn II a K/S value of 1.1.

EXAMPLE 2

A copolymer was produced by polymerizing a mixture of ethylene containing 5 percent by weight of acrylic acid. The polymerization was carried out as described in Example 1. The ethylene/acrylic acid copolymer produced had an acrylic acid content of 29.4 percent by weight and a melt index of 7 dgm./min. Thirty grams of this copolymer were slurried in 200 milliliters of anhydrous toluene at 95° C. for fifteen minutes and then a solution of 7.8 grams of potassium hydroxide in 100 milliliters of anhydrous ethanol was added and stirring continued for thirty minutes. The solution was then cooled to 40° C. and precipitated by addition to 1 liter of anhydrous ethanol. The precipitate was filtered, washed three times in 500 milliliters of anhydrous alcohol and dried in vacuo at 50° C. for sixteen hours. There was obtained 30.1 grams of an ethylene/potassium acrylate copolymer.

A blend of propylene with the ethylene/potassium acrylate copolymer was produced as described in Example 1. This blend was melt spun at 280° C. through a spinnerette having 25 holes, each 0.030 inch in diameter. The orifice velocity was 3.1 ft. min. and the take-up velocity was 620 ft./min. The yarn was steam stretched 275 percent. The multifilament yarn had a tenacity of 3.6 g.p.d., a stiffness modulus of 29 g.p.d. and an elongation of 27 percent. It was dyed a deep blue shade by Basic Blue 4 (C.I. 51004) whereas the unmodified polypropylene yarns were merely tinted.

EXAMPLE 3

In a manner similar to that described in Example 1, a copolymer was produced by polymerizing a mixture of ethylene containing 2.5 percent by weight of glycidyl acrylate. The ethylene/glycidyl acrylate copolymer produced had a glycidyl acrylate content of 13.2 percent by weight, a melt index of 0.92 dgm./min., and a density of 0.942 g./cc.

A blend of 70 parts polypropylene having a melt index of 4 dgm./min. and a density of 0.91 g./cc. with 30 parts of the ethylene/glycidyl acrylate copolymer was prepared as in Example 1. The film was dyed a medium red shade with Disperse Red 17 whereas a control film of unmodified polypropylene was tinted.

EXAMPLE 4

In a manner similar to that described in Example 1, a copolymer was produced by polymerizing a mixture of ethylene containing 3 percent by weight of acrylamide, the catalyst concentration was 6.7 p.p.m. The ethylene/acrylamide copolymer had an acrylamide content of 15.4 percent by weight, a melt index of 0.43 dgm./min., and a density of 0.972 g./cc. A film thereof was dyed a bright medium shade of blue with Acid Red 102 whereas a polypropylene film exhibited no dye pickup. Similar results are obtained with blends of the copolymer with polypropylene.

EXAMPLE 5

In a manner similar to that described in Example 1 but at 70° C. a copolymer was produced by polymerizing a mixture of ethylene containing 2.0 percent by weight of N,N'-dimethylaminopropylacrylamide; the catalyst was 5,000 p.p.m. of azo-bis-isobutyronitrile. The ethylene/N, N'-dimethylaminopropylacrylamide copolymer had an N, N'-dimethylaminopropylacrylamide content of 6.2 percent by weight, a melt index of 1.0 dgm./min., and a density of 0.933 g./cc. A film thereof was dyed a deep blue shade with Acid Blue 102.

A blend of 70 parts of polypropylene having a melt index of 4 dgm./min. and a density of 0.91 g./cc. with 30 parts of the above copolymer was prepared as in Example 1. The blend was molded into a 7 mil film which dyed deep red with Acid Red 225, a neutral premetallized dye, and a medium red with Disperse Red 17. A similar film prepared from polypropylene per se was merely tinted by the same dyes. Further, the films from the copolymer and the blend are printable whereas the polypropylene film is not.

EXAMPLE 6

In a manner similar to that described in Example 1 but at 225° C., a copolymer was produced by copolymerizing a mixture of ethylene containing 2 percent by weight of t-butylacrylamide; the catalyst was 12 p.p.m. of t-butyl hydroperoxide. The ethylene/t-butylacrylamide copolymer had a t-butylacrylamide content of 14.9 percent by weight, a melt index of 1050 dgm./min. and a density of 0.924 g./cc.

A blend of 70 parts of polypropylene and 30 parts of the above copolymer was prepared as in Example 1 and molded into 7 mil film. The film was readily dyed by Disperse Red 17, Acid Red 225 and Acid Blue 102.

EXAMPLE 7

In a manner similar to that described in Example 1 but at 70° C., a copolymer was produced by polymerizing a mixture of ethylene containing 5 percent by weight of sodium-2-acrylamido-2-methylpropane sulfonate; the catalyst was 70 p.p.m. of potassium persulfate. The ethylene/sodium-2-acrylamido-2-methylpropane sulfonate copolymer had a 2.9 percent by weight content of the sulfonate monomer, a melt index of 0.1 dgm./min. and a density of 0.936 g./cc.

A blend of 70 parts of polypropylene and 30 parts of the above copolymer was prepared as in Example 1 and molded into 7 mil film. The film was readily dyed by Disperse Red 17 and Basic Blue 4 whereas the control film of polypropylene per se was not.

EXAMPLE 8

In a manner similar to that described in Example 1 but at 152° C., a copolymer was produced by polymerizing a mixture of ethylene containing 27.3 percent by weight of vinyl acetate; the catalyst was 96 p.p.m. of di-tertiarybutylperoxide. The ethylene/vinyl acetate copolymer had a vinyl acetate content of 18.5 percent by weight, a melt index of 1.54 dgm./min. and a density of 0.940 g./cc.

A blend of 70 parts of polypropylene with 30 parts of the above copolymer was prepared as described in Example 1. The blend was melt spun at 285° C. through a spinnerette having 25 holes, each 0.030 inch in diameter. The orifice velocity was 3.1 feet per minute and the take-up velocity was 465 feet per minute. The yarn was given a steam stretch treatment of 330 percent. The multifilament yarn had a tenacity of 5 g.p.d., a stiffness modulus of 46 g.p.d., an elongation of 32 percent, and boiling water shrinkage of 7.5 percent. The yarn was dyed to bright medium red shades with Disperse Red 17 and Acid Red 225.

EXAMPLE 9

In a manner similar to that described in Example 1 but at 90° C., a copolymer was produced by polymerizing a mixture of ethylene containing 5 percent by weight of sodium vinyl sulfonate; the catalyst was 2080 p.p.m. of potassium persulfate. The ethylene/sodium vinyl sulfonate copolymer had a sodium vinyl sulfonate content of 11.6 percent by weight, a melt index of 0.23 dgm./min. and a density of 1.00 g./cc. A film molded from this copolymer was dyed a deep blue shade with Basic Blue 4.

A blend of 70 parts of polypropylene with 30 parts of the above copolymer was prepared as described in Example 1. Tthe blend molded into 7 mil film which was readily dyed by Disperse Red 17 and Disperse Blue 4. A control film of polypropylene per se was tinted with Disperse Red 17 and unaffected by Disperse Blue 4.

While the disclosure stresses polypropylene, it is to be noted that other polyolefins from mono alpha olefins having from 2 to about 10 carbon atoms can be substituted for polypropylene. For example, polyethylene, poly(butene-1), poly(4-methylbutene-1), poly(hexene-1), poly(decene-1), and the like, or mixtures thereof.

What is claimed is:

1. A composition comprising a blend of (A) from about 20 to 99 percent by weight of a solid polypropylene and (B) from about 1 to 80 percent by weight of a copolymer of ethylene and a member selected from the group consisting of acrylyl compounds of the formula

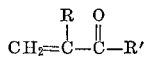

wherein R is a member selected from the group consisting of hydrogen and methyl; R' is

R" is a member selected from the group consisting of hydrogen and alkyl; said R' containing from 1 to 10 carbon atoms; said copolymer containing in the copolymer molecule from about 0.5 to about 50 percent by weight of said polymerizable acrylyl compound therein.

2. A composition comprising a blend of (A) from about 60 to 97.5 percent by weight of a solid polypropylene and (B) from about 2.5 to 40 percent by weight of a copolymer of ethylene and a member selected from the group consisting of acrylyl compounds of the formula

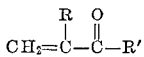

wherein R is a member selected from the group consisting of hydrogen and methyl; R' is

R" is a member selected from the group consisting of hydrogen and alkyl; said R' containing from 1 to 10 carbon atoms; said copolymer containing in the copolymer molecule from about 5 to about 40 percent by weight of said polymerizable compound therein.

3. A composition comprising a blend of (A) from about 80 to 95 percent by weight of a solid polypropylene and (B) from about 5 to 20 percent by weight of a copolymer of ethylene and a member selected from the group consisting of acrylyl compounds of the formula

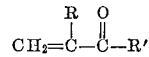

wherein R is a member selected from the group consisting of hydrogen and methyl; R' is

R" is a member selected from the group consisting of hydrogen and alkyl; said R' containing from 1 to 10 carbon atoms; said copolymer containing in the copolymer molecule from about 10 to about 30 percent by weight of said polymerizable acrylyl compound therein.

4. A composition comprising a blend of (A) from about 60 to 97.5 percent by weight of a solid polypropylene and (B) from about 2.5 to 40 percent by weight of a copolymer of ethylene and an acrylyl containing compound of the formula

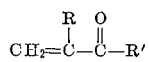

wherein R is a member selected from the group consisting of hydrogen and methyl; R' is

and R" is a member selected from the group consisting of hydrogen and alkyl, said R' group containing from 1 to 10 carbon atoms; and said copolymer containing in the copolymer molecule from about 5 to 40 percent by weight of said acrylyl compound copolymerized therein.

5. The composition of claim 4 wherein component (B) is a copolymer of ethylene and acrylamide.

6. The composition of claim 4 wherein component (B) is a copolymer of ethylene and N,N-dimethylaminopropylacrylamide.

7. The composition of claim 4 wherein component (B) is a copolymer of ethylene and t-butylacrylamide.

8. The composition of claim 4 in the form of a filament.

9. The composition of claim 4 in the form of a film.

References Cited

UNITED STATES PATENTS

| | | | |
|---|---|---|---|
| 2,893,970 | 7/1959 | Caldwell et al. | 260—897 |
| 3,003,845 | 10/1961 | Ehlers | 260—897 |
| 3,163,492 | 12/1964 | Thomas | 260—897 |
| 3,248,359 | 4/1966 | Maloney | 260—897 |

FOREIGN PATENTS

| | | |
|---|---|---|
| 582,093 | 11/1946 | Britain. |
| 902,809 | 8/1962 | Britain. |
| 1,294,699 | 4/1962 | France. |
| 1,274,733 | 8/1961 | France. |

MURRAY TILLMAN, *Primary Examiner.*

L. J. BERCOVITZ, SAMUEL H. BLECH, *Examiners.*

J. A. KOLASCH, E. B. WOODRUFF, T. G. FIELD,
*Assistant Examiners.*